(12) United States Patent
Günther et al.

(10) Patent No.: US 6,421,750 B1
(45) Date of Patent: Jul. 16, 2002

(54) SYSTEM AND METHOD FOR RECORDING DIGITAL DATA ON GLASS MASTER RECORDING DISKS

(75) Inventors: Christian Günther, Rosdorf; Wolfgang Martens, Gütersloh; Artur Redder-Pohlmann, Rheda-Wiedenbrück, all of (DE)

(73) Assignee: Sonopress Produktionsgesellschaft für Ton- und Informationsträger mbH, Gütersloh (DE)

( * ) Notice: Subject to any disclaimer, the term of this patent is extended or adjusted under 35 U.S.C. 154(b) by 0 days.

(21) Appl. No.: 09/685,349

(22) Filed: Oct. 10, 2000

Related U.S. Application Data (63) Continuation of application No. 09/029,446, filed as application No. PCT/EP97/03501 on Jul. 3, 1997, now abandoned.

(30) Foreign Application Priority Data

Jul. 11, 1996 (DE) .......................... 196 28 005

(51) Int. Cl.⁷ ............................. G06F 3/00; G06F 13/00
(52) U.S. Cl. ............................. 710/72; 369/13; 369/59; 369/85
(58) Field of Search ............................. 710/72; 369/85, 369/13, 59

(56) References Cited

U.S. PATENT DOCUMENTS

| | | | | |
|---|---|---|---|---|
| 4,496,997 A | * | 1/1985 | Ohtsuki | 360/13 |
| 4,811,325 A | * | 3/1989 | Sharples, Jr. et al. | 369/275.1 |
| 4,937,807 A | * | 6/1990 | Weitz et al. | 369/85 |
| 5,313,612 A | * | 5/1994 | Satoh et al. | 711/162 |
| 5,325,352 A | * | 6/1994 | Matsumoto | 369/275.1 |
| 5,661,715 A | * | 8/1997 | Blaukovitsch | 369/275.4 |
| 6,011,758 A | * | 1/2000 | Dockes et al. | 369/30 |

FOREIGN PATENT DOCUMENTS

| | | |
|---|---|---|
| DE | 38 20 835 A | 1/1989 |
| DE | 94 14 675 U | 11/1994 |
| EP | 0 074 841 A | 3/1983 |
| EP | 0 312 405 A | 4/1989 |
| EP | 0 312 406 A | 4/1989 |
| EP | 0 500 044 A | 8/1992 |
| EP | 0 598 392 A | 5/1994 |
| EP | 0 708 445 A | 4/1996 |

OTHER PUBLICATIONS

Yonge M et al: "An Audio Workstation Network for Television Postproduction", Jun. 13, 1991, Broadcast Sessions, Montreux, Jun. 13–18, 1991 vol. –, No. –, pp. 231–238, CCITT XP000268892 190720.

* cited by examiner

*Primary Examiner*—Jeffrey Gaffin
*Assistant Examiner*—Tammara Peyton
(74) *Attorney, Agent, or Firm*—Henry M. Feiereisen

(57) ABSTRACT

A system concept and the components integrated therein for storing useful and control information as well as feature items, general components for data flow control of all components integrated in the system concept as well as special components for data flow and process control of interface systems for laser-beam recorders permit handling of useful and control information as well as feature items independently of physical music/data carriers within premastering and the production of glass masters (mastering) in CD plants. All the various types of information are stored in on-line compatible mass storages and automatically transferred into the sectors calling for the information concerned by general data flow control components. Requests for information can be generated manually or automatically. The time needed to transfer to the requesting sectors or machines is shortened, the premastering expense reduced, the mastering actions automated with the aid of special control components and considerably speeded up as compared to conventional methods by using a network as the carrier medium.

10 Claims, 8 Drawing Sheets

SYSTEM AND METHOD FOR RECORDING DIGITAL DATA ON GLASS MASTER RECORDING DISKS

This is a continuation of patent application Ser. No. 09/029,446 filed Mar. 5, 1998 now abandoned, which is a 371 of PCT/EP97/03501 filed Jul. 3, 1997.

BACKGROUND OF THE INVENTION

1. Field of the Invention

The invention relates to prestage processes necessary in state of the art production of glass masters for compact disk replication.

2. Description of the Prior Art

Currently, the useful information made available to CD manufacturers for the purpose of replication is furnished on a plurality of greatly differing music/data carriers, each having highly specific features, depending on the existing infrastructure of the client placing the order and the nature of the information concerned. In this respect the type of music/data carrier selected decisively influences both the time and depth needed for processing in the CD plant. At this time the following music/data carriers are of significance throughout the branch:

| Music/data carrier | read/write speed | other important features |
|---|---|---|
| Analog tapes | real time | digital conv. necessary low speed high processing expense |
| 9-track tapes | real time | low storage capacity low speed high processing expense |
| U-matic tapes | real time | low speed prone to error low storage capacity medium to high processing expense |
| DAT tapes | real time | medium storage capacity low speed medium processing expense |
| Exabyte tapes | approx. 2–3 times real time | high speed rel. high date security high storage capacity low to medium expense |
| CD-WO/MO disks | approx. 2 times real time | high speed rel. high date security high storage capacity low processing expense |

Premastering

Depending on the nature on the music/data carrier furnished, its mechanical/physical quality as well as the structure of the useful information, various steps in processing prior to mastering, i.e. premastering are required of the CD manufacturer specific to the music or data carrier involved. These processing steps may involve e.g. inspection on receival for faults in the carrier (e.g. poor tape quality), adding supplementary information (subcode data, producing a disk description protocol (DDP)), and, where necessary, correcting the useful information stored or the structure thereof as ordered by the client. These checking and processing tasks are usually done on PCs or workstations to which the necessary input/output units specific to the carrier concerned are connected (see FIG. 5 on page 41).

For implementing these checking and processing tasks, and depending on the music/data carrier or necessary depth of processing involved, it is often necessary to make a partial or even complete transfer of the information to the hard disk(s) of the checking or processing system. To ensure a zero-error, bit-accurate transfer of the useful information on the hard disk concerned an error protocol may be included in the write-in. In addition the reading speed of the input units can be reduced to a value technically as low as possible, current values in this respect being one to maximally almost three times the real time relative to the play duration of a CD, depending on the nature on the music/data carrier concerned (see Table on page 1).

If premastering procedures were necessary or if the type of music/data carrier used failed to provide adequate performance values for subsequent steps in processing, the useful and control information is subsequently copied onto a music/data carrier which ensures a reading speed and data security as high as possible (see FIG. 7, page 43). Depending on the infrastructure and requirements on the CD plant exabyte tapes, CD/WO disks, MO disks or also U-matic tapes currently find application. (all of these being simply termed "transfer media" in the following). The transfer media produced in premastering contain in general all useful information existing later on the CD (main channel and subcode data) supplemented by control data (e.g. DDP) for later mastering. Useful and control information may also be held on separate music/data carriers (e.g. useful contents on exabyte tape, control information on floppy disk).

An error protocol may be included in the writing procedure comparable to the procedure in reading-in the useful information when the transfer is made to other music/data carriers.

Once premastering has been completed and the transfer media has successfully passed through all steps in checking and processing the useful information stored thereon needs to be transferred to an optical intermediate carrier (a light-sensitive glass disk, termed glass master in the following) with which in further steps in processing an electroplate replicate is implemented.

Mastering

Glass disks having special mechanical and optical properties serve as the intermediate carrier. In preparing for mastering the glass disks are cleaned and coated with a very thin, tight tolerance light-sensitive layer which is subsequent baked by the application of heat in corresponding devices. The methods and equipment used for this purpose are similar to those employed by the semiconductor industry. Due to the high demands on the cleanliness of the materials used, the tight tolerances on thickness of the light-sensitive coating and the necessary stability in processing, this procedure is highly time and hardware intensive.

The glass disks once finished in preparation are inserted in a laser-beam recorder (LBR) prior to commencement of the actual mastering process, an interface (LBR interface) as well as readers for the transfer media being connected to the laser-beam recorder. For this purpose use is made typically of CD, exabyte or U-matic drives in accordance with the transfer media as listed above (see FIG. 1, page 37 and FIG. 3, page 39). The task of the laser-beam recorder, its control hardware, the LBR interface and the connected readers is to convert the useful and control information held on the transfer media into a data stream required by the desired type of CD and to transfer the logic data structure needed for the corresponding type of CD to the light-sensitive coating on the glass disk.

For this purpose the laser beam impinging the rotating glass disk is modulated in an interplay of useful and control information with the aid of the LBR interface and the control hard/software of the laser-beam recorder. The result is a continuous sequence of light pulses the length and gaps of which are precisely defined as formed on the glass disk as a spiral chain of exposed and non-exposed positions. In this arrangement, converting the useful and control information into a continuous data stream and the speed in reading the transfer media need to be intimately adapted to each other. Since the laser-beam recorders employed need a continuous data stream as a mandatory requirement, keeping to an average minimum data rate for the readers and transfer media employed is necessary. By current state of the art standards it is the reading speed which dictates the speed at which the desired data stream can be written on the glass disk.

Due to the non-reversibility of this transfer action uncorrected reader errors, interruptions in the data stream to the laser-beam recorder or errors in transfer in the laser-beam recorder result in a glass master which is useless for further steps in processing. Once an error has been written onto the glass master, caused by non-correctable bit errors or by an interruption in the data stream, no correction is possible in the same working procedure. If such non-correctable errors have been detected, the procedure needs to be discontinued and the complete mastering process repeated.

Glass masters exposed with zero error are developed, provided with a thin metal coating and passed on to the subsequent electroplating.

The transfer media used for mastering are in general subsequently deposited in manually administered libraries in the CD plant in case subsequent mastering orders are required.

II) Disadvantages of Prior Art

Even when employing transfer media having a comparitively high read/write speed within the bandwidth of music/data carriers as usual in the branch (CDWO, MO disks, exabyte tapes) the data rates of approx. 3.5 Mbit/sec. currently achievable are low compared to the technical/physical possibilities of the laser-beam recorders used (approx. 25 Mbit/sec.). Transfer media such as exabyte or CD drives thus make use of only a fraction of the existing performance capabilities of laser-beam recorders.

To amortisize the high investment and operating costs of laser-beam recorders which bear no comparison to those of music/data carrier drives CD plants wish to make full use of the performance capabilities of existing laser-beam recorders. Since every non-correctable error inevitably results in having to repeat the complete procedure (a factor taking up a lot of time and money due to the steps involved as described) non-correctable errors in readers and transfer media, operating errors by personnel as well as non-correctable bit errors in transmission need to be avoided. Although the built-in safety mechanisms in CDWO, MOD disk or exabyte tapes achieve higher data rates and more reliable transfer as compared to other music/data carriers usual in the branch they are stressed to the limits of their performance capabilities. Since a substantial safety mechanism consists in re-reading fault positions, the peak data rate of the reader needs to be substantial higher in assuring a continuous minimum data stream than that required on an average. It is only by this asynchronous fast reading, re-reading in case of an error and buffering part of the data stream that a relatively high operating reliability is assured. Since, however, the probability of a reading error occurring increases with the speed of the reading procedure out of all proportion, a compromise is made between process stability and speed in the case of systems usually employed for readers nowdays in mastering. For the above reasons process stability has absolute priority over rapidity.

All current procedures for transferring useful information to the glass master are carried out with the aid of so-called physical transfer media. Ensuring that transfer media is available in time, that the tasks to be done are correctly sequenced as compared to the work specifications, that the transfer media is properly inserted in the corresponding readers and starting transfer actions all needs to be done manually by suitably trained personnel. Accordingly, there is always the risk of jobs being confused, operator errors or late starting in mastering. In addition, due to the risks involved in interrupting the process there is a need for trained personnel also throughout the complete transfer procedure. Accordingly, automating the steps in the process described is possible only with difficulty or not at all on the basis of technology and infrastructure as currently applied.

When premastering of the furnished music/data carrier is required in the CD plant or should the type of music/data carrier employed be useless for mastering due to poor performance, the useful and control information is copied onto music/data carriers ensuring higher reading speed and data safety. Since the cited premastering procedures usually involve making use of the hard disk(s) of the processing systems, dual copying is needed prior to actual mastering (copying the music/data carrier onto hard disk, and then copying from there to the transfer media). Due to the low performance as regards data transfer rate or data security and the required bit-accuracy and zero-error in transfer the read/write process is done at a relatively low speed as compared to that of later mastering. Each and every additional step in processing or in the copying process increases the probability of non-correctable errors occuring. Accordingly, speedy and reliable job handling within the CD plant is subject to heavy restrictions in accordance with prior art.

With the arrival of new CD formats (e.g. multichannel audio, digital video disk, audio with higher sampling frequencies or resolution per sampling) new input hardware needs to be procured to which existing laser-beam recorders or steps in checking and processing have to be connected. This necessitates both investment costs in additional hard/software and higher overheads in hard/software maintenance, release updating and further training of personnel. In addition every arrival of a new CD format involves new format changes in premastering, resulting in added investments in the hardware needing to be made available.

Due to the mastering requirements on data transfer rate and data safety the readers used in conjunction with laser-beam recorders are tailored solutions of corresponding low volume, thus involving an high initial outlay and overheads.

On top of this the arrival of new CD formats in the future is coupled with the need for data carriers providing the necessary storage capacities of several gigabytes at a reasonable price and, where possible, on a single carrier whilst simultaneously permitting high read/write data rates for the processing and copying procedure. Current music/data carriers are unable to satisfy these performance requirements, thus necessitating a total new investment in CD plants in both the premastering and mastering sectors.

Since each individual type of music/data carrier has its own characteristic features, specialist knowledge as to mechanical handling as well as regards the logical structure is currently needed. The same requirements occur as regards the hard/software employed in the read/write hardware as well as the system infrastructure for changes in format. The operator surfaces, sophistication features and functionalities of the systems employed greatly differ from each other. Accordingly, correspondingly trained personnel is needed in premastering for processing and conversion as well as in mastering for the transfer to the glass masters.

Common to all input systems as usually employed nowadays in mastering is the lack of any automated diagnosis and remote maintenance, or these facilities being provided only to a limited extent.

SUMMARY OF THE INVENTION

III) Object of the Invention

It is thus the object of the invention to enhance the rapidity of the cited process sequences, this relating, on the one hand, to adapting the transfer rates of transfer media to the technical/physical possibilities of existing laser-beam recorders and, on the other, to shortening or eliminating the need for reformatting in premastering. It is intended to define the invention extensible to such an extent that both conventional and new work sequences can be accommodated in a transitional phase. In addition the invention is intended to enhance the overall stability and error detection reliability of the work sequences involved.

A further object of the invention is to provide simple and format-neutral accommodation of future developments in optical storage media (e.g. newly introduced CD formats placing additional demands on transfer bandwidths and storage capacity) necessitating no new investments or only to a minor degree.

Furthermore, the invention is intended to permit compatibility with automated production control systems to reduce the manual effort currently needed in this respect.

A last object of the invention is to configure the components employed modular to such an extent that they exhibit a high degree of flexibility and scaling capability. It is intended that the achievement of the invention is applicable to both small and large CD plants and permits simple adaptation to future extensions.

IV) Object Achievement

Figure 2:
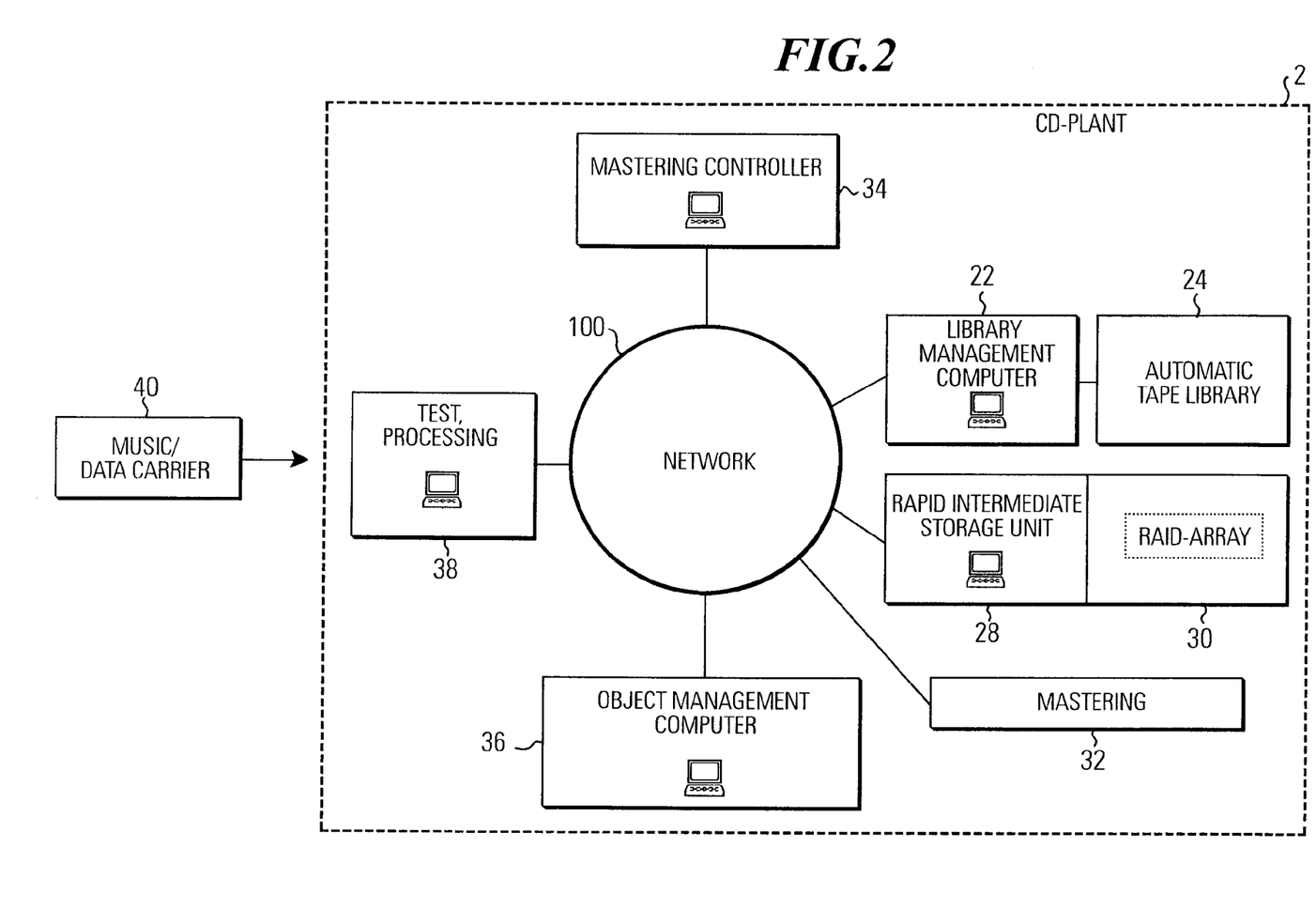
FIG. 2 is a schematic representation of an example embodiment in accordance with the invention.

The achievement of the objects involved consists of providing a network interconnection of the PCs and/or workstations employed in premastering and mastering to which additional on-line compatible mass storages for storing useful and control information are connected, along with a data base for storing the feature items of the useful information to be replicated and for storing instructions on this useful information, as well as modules for controlling the data flow throughout the complete network (see FIG. 2, page 38).

In this arrangement the network takes over the function of the transfer media used today with the advantage that the transfer rates made available as a standard are in the range of 10 Mbit/sec. to 100 Mbit/sec. and more. Depending on the type of network involved and the design of its configuration these data rates can be made available in both the burst mode as well as continuously. Since each data block transferred within the network is protocolled and any bit errors arising detected and corrected, an exceptionally high data safety is assured. The transfer rates provided by the networks are substantially higher than the data rates required on an average by laser-beam recorders. The correction procedures implemented by network protocols when an error occurs, relative to bit errors occuring during transfer, reduce the average transfer rate of networks so little that a sufficient performance reserve remains in addition to the minimum data rates required by laser-beam recorders. In selecting the type of network, its configuration, the physical transfer paths and the transport protocol no restrictions exist due to the facilities already available in the CD plant so that designing the individual requirements can be configured accordingly.

For mass storage any kind of on-line compatible storage may be used, the palette of solutions available on the market in this respect extending from simple PCs having a few gigabytes of hard disk capacity, through an array of many hard disks monitoring each other with redundancy (RAID arrays) up to large MO disk or automated tape libraries capable of handling data volumes totalling several hundred terabytes. From performance and cost considerations it is generally the case that a combination of the relatively slow and high-capacity libraries for long-term archiving with the low-capacity but fast hard disks or RAID arrays for short-term access is put to use. Mass storages reserved for short-term access may exist both as central units in the network or also distributed directly upstream of the laser-beam recorder or LBR interface in each case. From central mass storages the data files required for mastering are generally retrieved from the LBR interface as a continual stream of data. When a distributed arrangement of mass storages is used upstream of the LBR interface all useful and control information is firstly transferred in the burst mode from the long-term storages into the decentralized storage, from which the data is then subsequently continuously retrieved from the LBR interface for mastering. All useful and control information completed for mastering is then to be found either on the long-term or short-term (cache memory) storages, depending on the storage architecture and the momentary mastering status.

By making use of a useful and control information configuration based on discrete files no knowledge whatsoever as to the inner configuration of these files is needed for both the network and the mass storages, thus making for the wanted integration and extensibility irrespective of the format. It is only in premastering or in general at the point at which the useful information furnished by the client is copied for the first time into the mass storages incorporated in the network that format-dependent readers need to be provided.

The useful information furnished to the CD plant is transferred by means of checking and processing stations optionally either to the local hard disk or directly to one or more mass storages (preferably cache memories) incorporated in the network. Since current checking and processing systems are mostly not in a position to process data directly on a network disk, preference is currently given to transferring the data to the local hard disk of the processing system. Unlike the current procedure the useful and control information is no longer copied onto a transfer media on completion, it instead being directly transferred from the hard disk via the network onto one or more cache servers (see FIG. 6, page 42). As compared to the copying process on transfer media such as CD-WO, MO disk or exabyte tapes (approx. 3.5 Mbit/sec.) this is done at the substantially high transfer rate of the hard disks employed (approx. 8 Mbit/sec.).

In the future the processing stations will be in a position to directly undertake processing the useful information and to make the control information available directly to the mass storages (cache servers). The process for copying the useful information furnished by the client onto these cache servers can then be designed via corresponding hardware (e.g. jukeboxes) as an automated stack processing process so that a large number of music/data carriers the same in kind can be input without requiring manual supervision, thus making it possible to decouple both in time and space the input processes from the procedures required in processing. Processing or producing the useful and control information is subsequently done on the cache servers. The resulting data remains on the cache servers or can be shifted to a long-term storage with the aid of the data flow control.

In addition to the software for executing steps in checking and processing a data base surface (data base front end) is installed on the processing stations with the aid of which the link between useful and control information and the feature items assigned to this information in the data base is made possible. Feature items in this respect are allocated in general as explicit labels identifying each and every block of useful information belonging together (e.g. title, International Standard Recording Code (ISRC), artist, play time, in-house labels etc) for later making an explicit reference to the associated useful and-control information for mastering. Entering feature items is, however, not restricted to the aforementioned indications, it instead basically containing any additional information as may be needed.

Saving all useful and control information needed for mastering in mass storages connected to the network ensures that for each laser-beam recorder a sufficiently large number of jobs to be done is held in readiness for transfer to the laser-beam recorder at any time. This assures, on the one hand, for a corresponding data flow control that the laser-beam recorders are continuously supplied with jobs, whilst, on the other, each laser-beam recorder is able to work durably at its high speed due to the high transfer rates. In this arrangement the limits to the data transfer rates to the glass masters are not dictated by the network but by the maximum speed of the laser-beam recorder employed.

Checking the useful and control information needed for a certain mastering process, making this information available in due time to the cache servers, controlling the flow of useful and control information to the laser-beam recorders as well as producing the status messages regarding mastering is all implemented with the aid of software termed "mastering controller" in the following. The mastering controller is furthermore responsible for enabling mixed operation of mastering procedures via the network as well as via the physical transfer media. When the transfer is made via the network the mastering controller controls the complete mastering process fully automatically and makes status messages available on an associated terminal as well as process sequences should an error occur.

Figure 4:
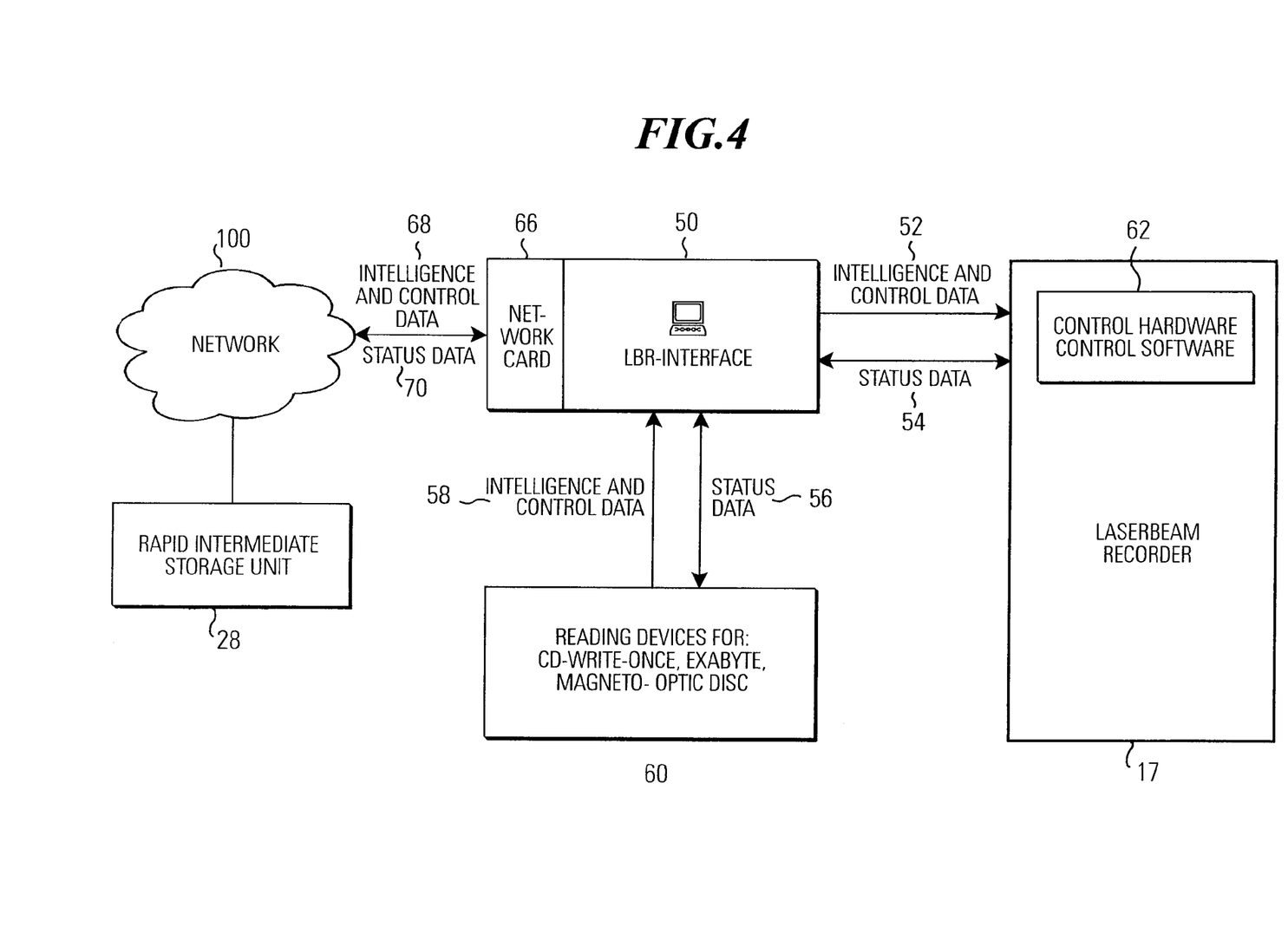
FIG. 4 shows an LBR interface linked to the network.

By rendering the LBR interfaces connected to the laser-beam recorders network-compatible there is the possibility of processing mastering by physical transfer media as well as via the network (see FIG. 4, page 40). All salient status messages as to what is happening in mastering are passed on to the mastering controller where they are analyzed and converted into corresponding reactions.

The task of the data base is to handle each package of useful and control information saved in the mass storages of the network (in general a specific number of data files belonging together logically) suitable feature items and indications as to the useful and control information and to ensure the specific link between feature items and the associated data files of the useful and control information in all operating conditions. When prompted by the mastering controller the data base establishes upfront in a mastering procedure, with the aid of labels, which data files are to be assigned to the job in each case or in which storages it is to be found. The mastering controller converts the indications contained therein into a specific sequence of reactions, prior to, during and following the mastering process.

Fully automated control of mastering by the mastering controller makes it possible to electronically link production control systems additionally available in the CD plant and to convert the information held therein as to e.g. job volumes, job sequence and their allocation to laser-beam recorders into corresponding mastering work processes.

Due to this open structure as well as utilizing uniform interfaces and components the concept as described permits changes and extensions to be made individually at any time in keeping with the changing requirements of the CD plant.

V) Benefits

The network types (Ethernet, FDDI, Token Ring, 100VG-AnyLAN etc) employed as state of the art in LAN and WAN traffic make data rates available, both as a shared medium and more than ever as a dedicated link, which are equivalent to or even far greater than those which can be handled physically/technically by laser-beam recorders. Making use of such networks as the carrier medium for the transfer of useful and control information ensures that the available transfer capacity of the laser-beam recorders can be fully utilized. In addition to this the on-going development in this field ensures in the foreseeable future that an adequate additional capacity exists relative to the transfer rates capable of being handled by laser-beam recorders.

Employing corresponding network protocols ensures date safety ratings (bit error rates) of approx. $10^{-15}$ thus making the network connections safer by more than the factor 100 than the readers currently employed with laser-beam recorders. Accordingly, bit errors in data transfer to the glass master, caused by errors in the transfer path between cache server and laser-beam recorder are thus practically excluded. Due to the high dissemination of networks worldwide and the transfer paths made thereon existing hard/software components are technologically sophisticated and available for purchasing at reasonable costs due to series production.

Using a standard network also enables useful and control information already existing on the hard disk of the processing or control system im premastering to be made available to the laser-beam recorder without delay. Thus, in the case of jobs on a tight time schedule mastering can be commenced directly following completion of premastering, thereby putting the CD plant in a position to react highly flexibly to greatly differing capacity situations and to reduce its thruput times.

Copying onto physical transfer media still necessary today is totally eliminated, reducing the time needed for premastering in the CD plant by approx. 25%.

Transferring the useful and control information to on-line compatible mass storages in the network enables this data to be durably saved, i.e. repetitions of like mastering procedures require no further activities, the mastering controller completely handling control and processing.

Contrary to current physical music/data carriers, employing electronically manageable long-term storages in the network having test routines available therein as standard permits fully automated error testing and, where necessary, correction of the stored data. The manual activities for archiving and care of transfer media, still needed today, are eliminated.

Furthermore, linking useful and control information to the feature information stored in the data base offers the possibility of configuring information systems for future audio applications such as "music on demand", "digital audio broadcasting", "digital video broadcasting" etc.

The generalized structure made up of input stations (in this case the checking and processing station), short and long-term storages, production station (in this case laser-beam recorders) as well as the associated control units such as the production controller (in this case the mastering controller) can likewise be put to use in various other areas of the media industry, for example, radio and TV broadcasting stations, audio studios and the printing industry, without the structure needing to be changed, it only being as regards the tasks involved and in the hard/software design that deviations may exist.

If the useful and control information prepared in the CD plant is saved on library media having electronic access (file management processors, RAID array, tape library, MO disk library) control and stack processing software can be used to control each mastering job individually and fully automatically and likewise assigned automatically to the laser-beam recorder available for the job in each case. By eliminating these activities which would otherwise need to be done manually, mistakes in job sequencing, errors in starting mastering or other operator errors are excluded.

Making use of standard components of the PC and network industry ensures a continual further development since the corresponding components can be put to use in high volumes in other areas also. On top of this, the improvements in performance usual for this market as regards data transfer rates and storage capacities result in a price/performance ratio becoming increasingly more favorable. Accordingly, first-time procurement, replacement or new procurments necessitate less expenditure as compared to "tailored" solutions for the components and systems currently employed in mastering.

Further developments as regards the transfer rate to the glass masters as made available by laser-beam recorders will be supported by existing networks in the long run without further infrastructural changes needing to be made for this reason. The overall performance capabilities in mastering will in the future be solely dictated by further developments in laser-beam recorders. Accordingly, new procurements or supplementary acquisitions resulting therefrom will be more or less restricted to the laser-beam recorders themselves.

The dynamic situation as regards the introduction of new storage formats, especially in the CD industry, has hitherto necessitated investments in drives for supporting each new format (checking and processing stations, format conversion stations, input units for laser-beam recorders). As a transfer medium the network operates transparently (neutral in format) since merely the data files need to be transferred. No knowledge of their inner structure is needed for transfer via the network. Thus, new formats can be transferred irrespective of their inner structure and their background storage capacity. By replacing physical transfer media by a cross-system network new procurements to cope with new formats are restricted to premastering, and here only as regards inputting (inputting the formats to the data management computer, RAID array, tape library, MO disk library, etc.), i.e. reequipping for format conversions is no longer necessary.

Networking premastering and mastering activities results in the man/machine interfaces needed in handling the various formats now permits them to be configured uniform, this reducing on the one hand, the expense needed in training personnel, and on the other, resulting in the possibility of being able to assign existing personnel flexibly to different stations.

The use of modern multitasking operating systems on local PCs or workstations enables users to transfer useful and control information completed in processing to the short and long-term storages as a background task whilst already commencing with the next processing job as an up-front task, thereby boosting the performance capabilities of processing stations significantly.

Linking on-line compatible library media (data management computer, tape library, MO disk library, etc.) is now possible in differing combinations and degrees of sophistication due to the open structure, depending on the size and demands of the CD plant. Extensions in storage capacity needed due to higher demands can be made both by providing additional storage units and by upgrading existing storage units.

The design of the mastering controller enables several laser-beam recorders or LBR interfaces to be managed at the same time.

Managing and maintaining networks and the components connected thereto can be executed with telecontrol. In addition, as compared to current maintenance, substantial more detailed diagnostic findings as well as automated maintenance programs and error alarms are possible.

The useful information made available on order by clients to CD plants for replication is being generated to an increasing degree on hard-disk based recording systems and subsequently transferred to a music/data carrier merely for dispatch to the CD plant. This kind of transfer or conversion will be eliminated in the future with the arrival of low-price, high-rate transfer by telecommunication, thus doing away with the need of a carrier in further processing in the CD plant, i.e. having to input the furnished music/data carrier to the hard disks in premastering will be eliminated in the future in favour of direct input by the client into a data management computer in premastering.

DESCRIPTION OF THE PREFERRED EMBODIMENT

VI) Example Embodiment

A preferred example embodiment of the present invention will now be explained with reference to FIG. 2 on page 38.

General

The concept described is based on a client server architecture incorporating TCP-IP as the network protocol and NFS as the network file system. A RAID array equipped with a UNIX-compatible cache server handles short-term storage of useful and control information for mastering, inputting files from the checking and processing stations and providing defined minimum data rates to the laser-beam recorders. Long-term storage of useful and control information completed in processing, not immediately required in mastering, is held in an automated tape library having a capacity of several terabytes. Management of the contents stored therein is handled by a standard tape-management software, specific to the type of tape library concerned, installed on a UNIX-compatible library management computer. All mass storages contained in the network are tied to hierarchial storage management (HSM) software which dumps files no longer needed or of low priority into the long-term storage when the cache server hard disk capacities are "seen" to be insufficient. The input/output specifications and critical values for file shifting are dictated to HSM by the network system administrator. These specifications and critical values can be dynamically adapted to the individual requirements of the CD plant changing with time. In addition to organizing storage management the tape management software also handles all administration of storage media and activating the robotic and drive features in the long-term storage. User management of and access to the files transferred in the network (or the media objects concealed therein) is assured by a UNIX-compatible object management computer. Each file access and data transfer to the requesting computer is prompted by the object management computer as long as the requesting computer is correspondingly legitimated for use. Cache server as well as the library management computer or long-term storage are all linked to the network as logic drives, thus enabling user inquiries for files to be transferred to be served from all storage units connected. It is merely from the differences in the time needed for access that the user recognizes whether the data is retrieved from the fast, small cache server or from the slower, but larger long-term storage.

Object Management Computer

All management actions of and access to the data files generated are handled by an object management computer, this involving, among other things, management of access legitimation codes, assembling users in a hierachy or groups of users along with the associated rights, privileges and obligations, as well as providing functions for searching the useful and control information held in the files controlled on the basis of their features. The core element of the object management computer is a relational data base in which the feature items accompanying the useful and control information are held. In general, due to the data volume materializing, these feature items are saved in the data base whilst the useful and control information in held in the mass storages. In addition to the feature items labels relating to the files held in the mass storages are serviced in the data base. The task of the data base is to handle the feature items and labels assigned to each and every file or group of logically associated files saved and to ensure dedication of feature items/labels and files under all operating conditions. The structure of the data base is based on managing media objects occuring isolated or in nested media objects each having attendant features.

After being entered the useful information is available in its entirety as a continuous sequence of bytes in a single file. To maintain an overview of the individual clients and servers connected to the network in file handling and to make it possible to transfer the useful information also in part, large files can be dissected into smaller units. Such a dissection, in the case of a CD audio, is undertaken according to the itemization of the music recorded, this itemization in the file being taken from the protocol describing the CD, the disk description protocol (DDP). The object management computer has the tasks of making these dissections, logically compiling the resulting files and to administer the associated feature items, this procedure needing to be cancelled prior to mastering.

Each and every item of music of a music CD is considered as a media object. Linking the media objects to the associated features is done during processing/input procedures by the user of the processing station. When prompted by the mastering controller the data base "sees" in the forefield of a mastering process with the aid of labels which media objects or files are assigned to the job in each case and in which mass storages or in which network file directories they are located. The mastering controller converts the indications it receives into a specified sequence of reactions for controlling mastering.

Checking and Processing Stations

The contents of the music/data carriers furnished by the client for replication are copied onto the local hard disks of the respective processing station (PC or workstation). Here, the contents are processed and the necessary control information (e.g. the disk description protocol) added for mastering. This portion of the checking and processing stations is format-dependent and is able to communicate with all readers connected. If the format is changed or supplemented then this portion of the checking and processing stations is to be changed and supplemented accordingly.

In addition to the software needed for processing, every checking and processing station contains a data base surface (data base front end, client software of the object management computer) with the aid of which feature items can be added to the useful and control information, updated or modified. Storage of the useful and control information is done in the mass storages on the basis of the data base, the associated feature items being held within the data base. Such feature items could be e.g. entries made specific to recording such as "play times", "artist" and "title", of a more general nature such as classification according to "jazz", "pop", "techno", "classical" etc or in-house entries of the CD compilation such as "inventory No.", "tape No.", "order No." and so on. Due to status messages and control commands being swapped as necessary between the data base surface and software for controlling the input, both portions are interconnected via a control interface.

Since it cannot be excluded that portions of the useful and control information to be input has already been saved in the on-line compatible short or long-term storages, searching for useful and control information already existing can be done feature-controlled up-front in the transfer to the local hard disk. If portions of the useful and control information have already been input in earlier steps in processing these can be excluded from further steps in inputting and processing data. The checking and processing station thus provides the possibility of inputting individual portions of the useful and control information as a whole for the input process. For the system to "see" whether portions of the useful information have already been input or not it cross-checks the Table of Contents stored in the CD and/or the likewise stored European Article Numer/Universal Product Code (UPC/EAN code) of the entered music CD WOs or MO disks. To enable the entered useful and control information to be explicitly assigned to the mastering processes to take place later, an entry indicating a minimum volume of feature items is provided for checking. In the simplest case this is a combination of "title" and "artist" or "title" and "play time" or an in-house identifier. Any other identifier or combination of identifiers is just as possible in principle. In addition checking the feature items entered by the user as regards semantics and inner logic (consistency check) is provided for to inhibit wrong entries in the data base. Also inputs of portions of the useful and control information into the mass storages are not verified until the minimum volume of feature items is present and the checks as cited have been successfully concluded. Otherwise, in the absence of definitive identifiers the entered useful and control information would no longer permit being handled properly.

The status messages accumulating on the local hard disk during the input process are output for screen display on the PC or workstation. If errors have been detected which do not permit correcting, there is the possibility of cancelling the input process and to subsequently have it repeated. However, feature items once entered remain saved and need not be re-entered.

Cache Server

The tasks of the cache server is to buffer all useful and control information entered from the processing stations as well as to provide an adequate transfer rate and sufficient space on the hard disk for the jobs to be mastered. In conjunction with the hierarchial storage management of the library management computer the cache server also makes sure that files no longer required or files of low priority are dumped into the long-term storage should not enough space be available on the hard disk. The orientation for the code requirements governing this is the priority assigned to the various workstations connected to the network. Mastering procedures and their requirements on the cache server for space availability of the hard disk have priority over input procedures by steps in checking and processing. To ensure a smooth supply of finished jobs to the laser-beam recorders at least one job having all useful and control information is available in the cache server in addition to the job currently being handled for each connected laser-beam recorder. To avoid having to make additional data transfers from the long-term storages, should errors occur in mastering, the last finish-mastered job is additionally held in the cache server.

Due to the requirements on the transfer rate and fail-safe requirements of the data streams handled by the laser-beam recorders and due to input processes of processing stations occuring also at the same time as the output of data into the long-term storage a resources management is integrated which adapts all requested data streams to each other and, where necessary, runs those down having a low priority. Here too, mastering procedures generally have priority over all other input procedures of checking and processing stations or data transfers to the long-term storages.

The network file system used by the cache server ensures that its complete content is "seen" in the network as a logic drive with main and sub-directories. Should the hierarchial storage management detect a violation of the limits of the vacant space available on the hard disk, files are shifted out of the cache server into the long-term storage in accordance with the codes and limits dictated by the system administrator to create the needed vacant space available.

Library Management Computer

The task of the library management computer is to durably accommodate all input useful and control information in the long-term storage and to save a prescribed number of security copies of this information. The strategies for durably accommodating the information involve, on the one hand, automatically checking the quality of all storage media contained in the long-term storage at specified intervals, automatically reinstating (with the aid of security copies) the useful and control information after an error has occured, and, on the other, protecting the stored information from being accessed unauthorized. From the point of view of the client or the cache server the library management computer thus acts as a logic drive of practically infinitely large capacity. Providing archived useful and control information is always done on a server (library management computer or cache server) to the files of which requesting clients have direct access and can download a copy thereof on to their local hard disk for implementing processing, for instance.

Mastering Controller

The mastering controller looks after preparing and subsequent checking the status of the mastering procedures, the sequence of the jobs involved being dictated by the coupling to the production control system. The ID explicit to the files assigned to the mastering job is the "tape No." allocated to the processing stations for each job and stored in the data base.

The functionalities of the mastering controller are divided into two parts: the first part looks after the preparation tasks such as requesting files of a mastering job from the long-term storage or cache server and subsequently loading all useful and control information into a specific network file directory anticipated by the LBR interface. Distributing jobs to the laser-beam recorders is also controlled by this part of the mastering controller, but may be done manually in the case of special jobs or exceptional operating situations. The second part controls sequencing mastering and makes available all salient status messages of the mastering actions for display. By expanding the LBR interface to be network-compatible jobs can be implemented via both the network and via physical transfer media, the mastering controller supporting both kinds of mastering procedures.

By dividing the job sectors into two software components each indepent of the other, it is possible to separate the portion needed for preparation from that of pure mastering control. Both portions run either on one workstation or can also be installed on two machines located in different rooms. Dividing the system in this way enables the structure to be adapted to the various work sequences and requirements of the CD plant.

Activating preparation of the mastering process is triggered by sending the ID "tape No. XYZ" to the mastering controller. The mastering controller accepts this ID and adds it to the queue of a laser-beam recorder, the queue status being displayed on the mastering controller.

On the basis of the ID "tape No. XYZ" the mastering controller requests the corresponding data files from the object management computer and simultaneously passes on the names of the network disk and network file directory to the cache server in which the files are to be written. The object management computer searches the data base for the indications to the corresponding files, requests them from the library management computer and loads them into the desired network file directory. All important status messages exchanged between the object management computer and the mastering controller regarding the actions in requesting and the results thereof are swapped. The mastering controller is responsible for seeing to it that the requested files are available in due time for starting mastering and are present on the correct logic drive or the network file directory anticipated by the LBR interface.

To start a mastering job the mastering controller needs to implement the following actions:
- establish the presence of and checking all data files belonging to the mastering job
- checking that the indicated network path is maintained
- passing the start message to the LBR interface Together with the start command a number of parameters is passed on to the LBR interface by e.g. the desired speed of the mastering process and the number of repetitions of this job to be mastered being passed on. The LBR interface accepts these entries and, after status checking the laser-beam recorder, commences the transfer of the useful and control information to the glass master. For this purpose the useful and control information is taken from the known network path. In the course of mastering, status messages of the LBR interface are written into a predetermined network file directory. The mastering controller accepts this information and displays it. Should errors have occured during mastering, these are integrated in the messages which are analyzed by the mastering controller for implementing the necessary actions.

Due to the provision of both network compatibility and physical transfer media the LBR interface is able to implement both types of mastering procedures. Mastering procedures carried out with physical transfer media are signalled to the LBR interface. In the status messages generated by the LBR interface corresponding indications are entered in addition. The mastering controller "sees" these messages and takes the corresponding laser-beam recorder out of mastering procedures via the network, it not being until this condition has been reset and the corresponding message set by the LBR interface that the laser-beam recorder concerned is reinstated in the list of laser-beam recorders available for mastering via the network.

VIII) BRIEF DESCRIPTION OF THE DRAWINGS

Figure 1:
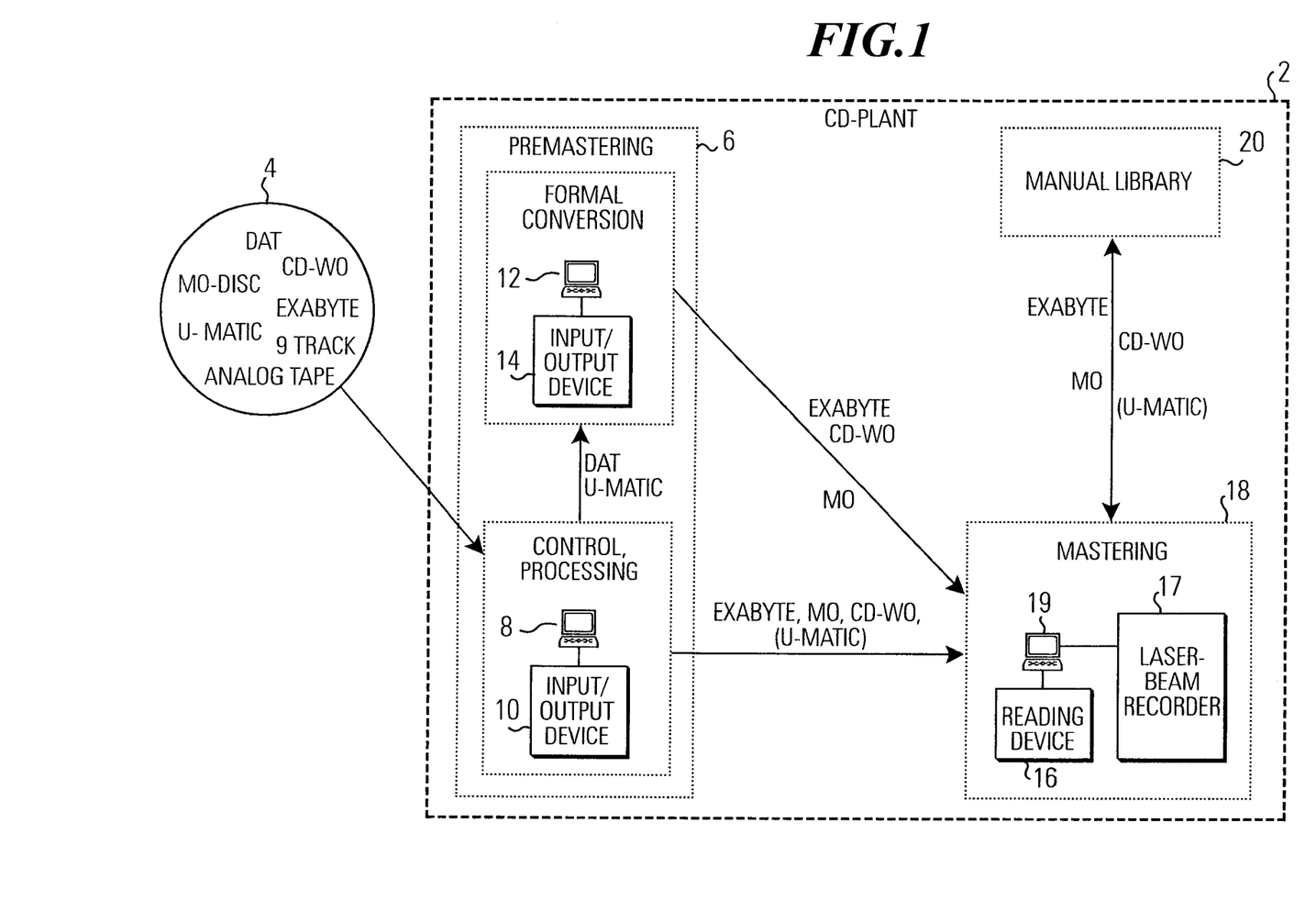
FIG. 1 is a schematic representation of the conventional work sequences for producing glass masters in CD plants.

FIG. 1

FIG. 1 is a schematic representation of the work sequences for producing glass masters in a CD plant. The useful information furnished to the CD plant 2 for the purpose of replication is made available on various music/data carriers 4. Within the CD plant 2 carrier specific steps in checking and processing are carried out on the music/data carriers 4 in the premastering sector 6. These steps in checking and processing necessitate special software on PCs or workstations 8 to which the corresponding carrier-specific input/output units 10 are connected. If furnished data carriers need to be copied to higher performance carriers due to the performance requirements in the mastering sector 18, this is done in a format conversion station 12 (PC or workstation) to which the corresponding input/output units 14 are connected. If no change in format of the input media is needed these can be made directly available to the mastering sector 18 on completion of the steps in checking and processing. The transfer media passed on to the mastering sector 18 are manually inserted into the readers 16 of the LBR interface 19 and subsequently a new glass master is made with the aid of the laser-beam recorder 17 and its control hard/software. After mastering transfer media are deposited in a manual library 20. When later mastering using the same transfer media is required the latter can be again made available to the mastering sector 18 from the manual library 20 without any further steps in checking and processing.

FIG. 2

FIG. 2 is a schematic representation of an example embodiment in accordance with the invention. Music/data carriers 40 furnished by clients for the purpose of replication are input into the checking and processing stations 38. All hardware existing in the CD plant 2 is interconnected via network 100 throughout all sequences in producing glass masters. On completion of the useful and control information by the checking and processing stations 38 the useful and control information is transferred via the network 100 to a library management computer 22. The library management computer 22 makes sure that this data is durably saved in an automatic tape library 24. When mastering jobs are to be implemented the useful and control information saved in the automatic tape library 24 is requested by the mastering controller 34. The object management computer 36 checks for authorization to use and handles the control of the flow of useful and control information from the automatic tape library 24 via the library management computer 22 into the RAID array 30 of the cache server 28 where the data is then available for the mastering sector 32.

Figure 3:
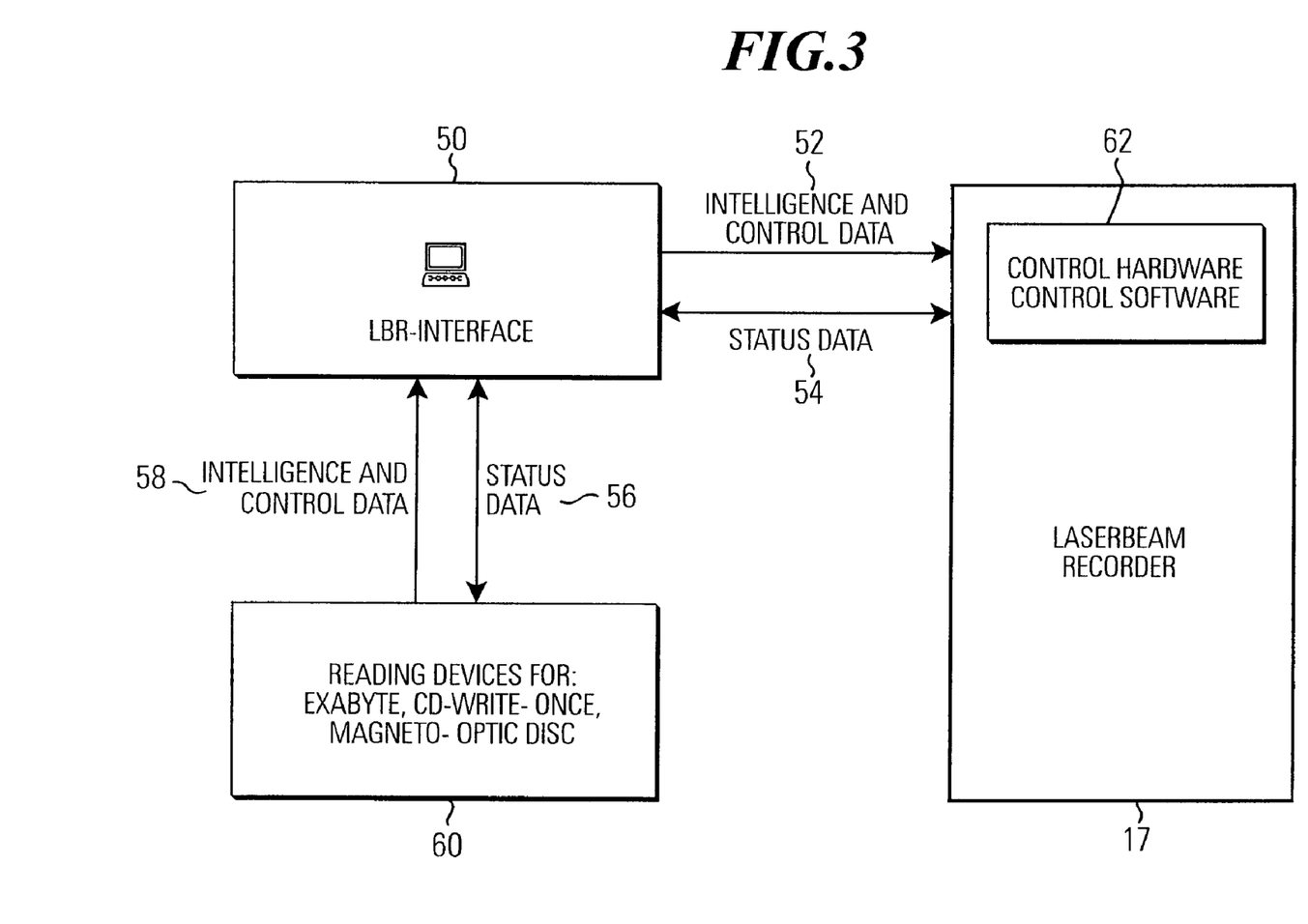
FIG. 3 illustrates the data flow and hardware components of LBR interface and laser-beam recorder

FIG. 3

FIG. 3 illustrates the data flow and hardware components of the mastering sector. The LBR interface 50 consists of a PC or a workstation to which the necessary readers 60 are connected. During mastering, status information 56 is swapped between the LBR interface 50 and the readers 60. The useful and control information 58 available on the transfer media is read by the readers 60, converted by the LBR interface 50 into a flow of useful and control information 52 as needed by the respective type of CD and made available to the control hard/software 62 of the laser-beam recorder 17. In addition, status information 54 is swapped during mastering according to the actions involved.

FIG. 4

FIG. 4 is a schematic illustration of the LBR interface 50 expanded by it now being network-compatible. The LBR interface 50 consists of a PC or workstation to which the readers 60 are connected. Between the LBR interface 50 and the readers 60 status information 56 is swapped during mastering. The useful and control information 58 existing on the transfer media is read by the readers 60, converted by the LBR interface 50 into a data flow of useful and control information 52 as needed for the respective type of CD and made available to the control hard/software 62 of the laser-beam recorder 17. In addition, status information 54 is swapped during mastering according to the actions involved. Integrated in the LBR interface 50 is a network card 66 which provides the connection to the network 100. Similar to the procedures relative to the transfer media the useful and control information 68 in this case is read via the network 100 from the cache server 28 via the network card 66 and converted by the LBR interface 50 into a data stream 52 as needed for the respective type of CD. The status messages 54 generated during mastering by the control hard/software 62 are sent to the LBR interface 50. Conversely the control hardware 62 also receives status messages 54 for controlling the laser-beam recorder 17. The LBR interface 50 generates additional status messages 70 regarding the request of useful and control information 68 to the cache server 28 and respectively receives corresponding messages 22 regarding the corresponding status of the cache server 26.

Figure 5:
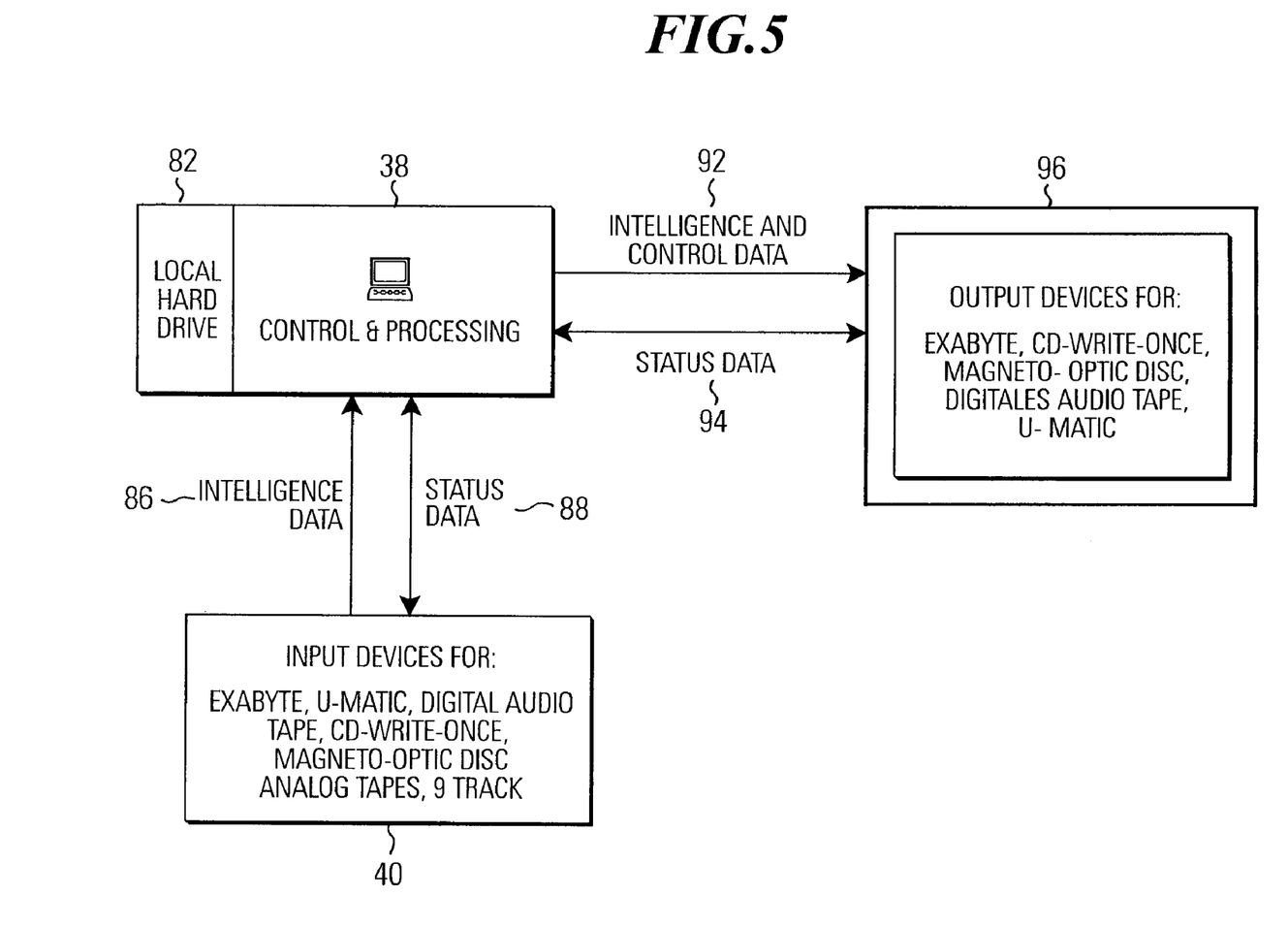
FIG. 5 illustrates the data flow and hardware components of checking and processing stations.

FIG. 5

FIG. 5 illustrates the data flow and hardware components of checking and processing stations. The checking and processing stations 4 consist of a PC or a workstation to which the input units 40 and output units 96 respectively are connected. For the checking and processing procedures the useful information 86 stored on the music/data carriers is read into the checking and processing station 38 and saved on the local hard disk 82. During this transfer procedure status information as to the actions of the procedure is swapped between the checking and processing station 38 and the readers 40. Processing the useful information and generating the necessary control information is done on the hard disk 82. On completion of process and control respectively the useful and control information is copied as a data stream 92 into the output units. During copying status information as to the proper sequence is swapped between the output units 96 and the checking and processing station 38.

Figure 6:
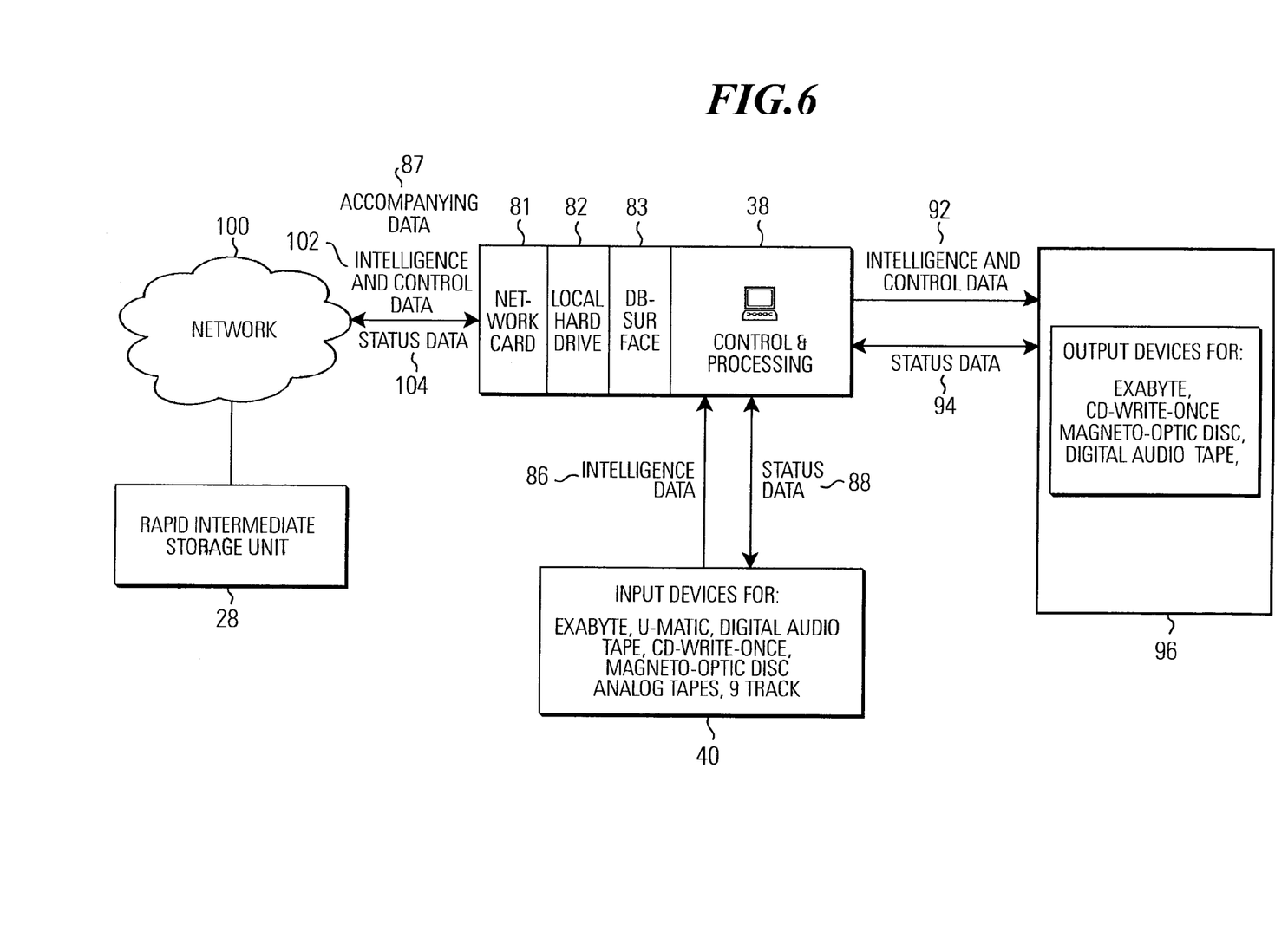
FIG. 6 shows the checking and processing stations linked to the network.

FIG. 6

FIG. 6 is a schematic representation of checking and processing stations 38 linked to the network. The checking and processing stations 38 consist of a PC or a workstation to which the required input units 40 and output units 96 respectively are connected. For the checking and processing procedure the useful information 86 stored on the music/data carriers is read into the checking and processing station 38 and saved on the local hard disk 82. During this transfer procedure status information as to the actions of the procedure is swapped between the checking and processing stations 38 and the readers 40. Processing the useful information and generating the necessary control information is done on the hard disk 82. On completion of process and control respectively the useful and control information is copied as a data stream 92 into the output units. During copying status information as to the proper sequence is swapped between the output units 96 and the checking and processing station 38.

Integrated additionally in the checking and processing station 38 are a data base surface 6 and a network card 81. With the aid of the data base surface 83 the user of the checking and processing station 38 is able to add feature item information 87 to the entered useful information 86. Analogous to the procedure as described above the checking and processing station generates control information which is likewise stored on the local hard disk 82. On completion of processing or checking the useful information 86 by the checking and processing station 38 the useful and control information is either copied as a data stream 92 into the output units or transferred as a data stream 102 via the network 100 into the cache server 28. During transfer, information as to the proper sequence is swapped between the cache server 28 and the checking and processing station 38. Storing the useful and control information is done file-based in the mass storages connected to the network, the storage of the associated feature items within the data base of the object management computer.

Figure 7:
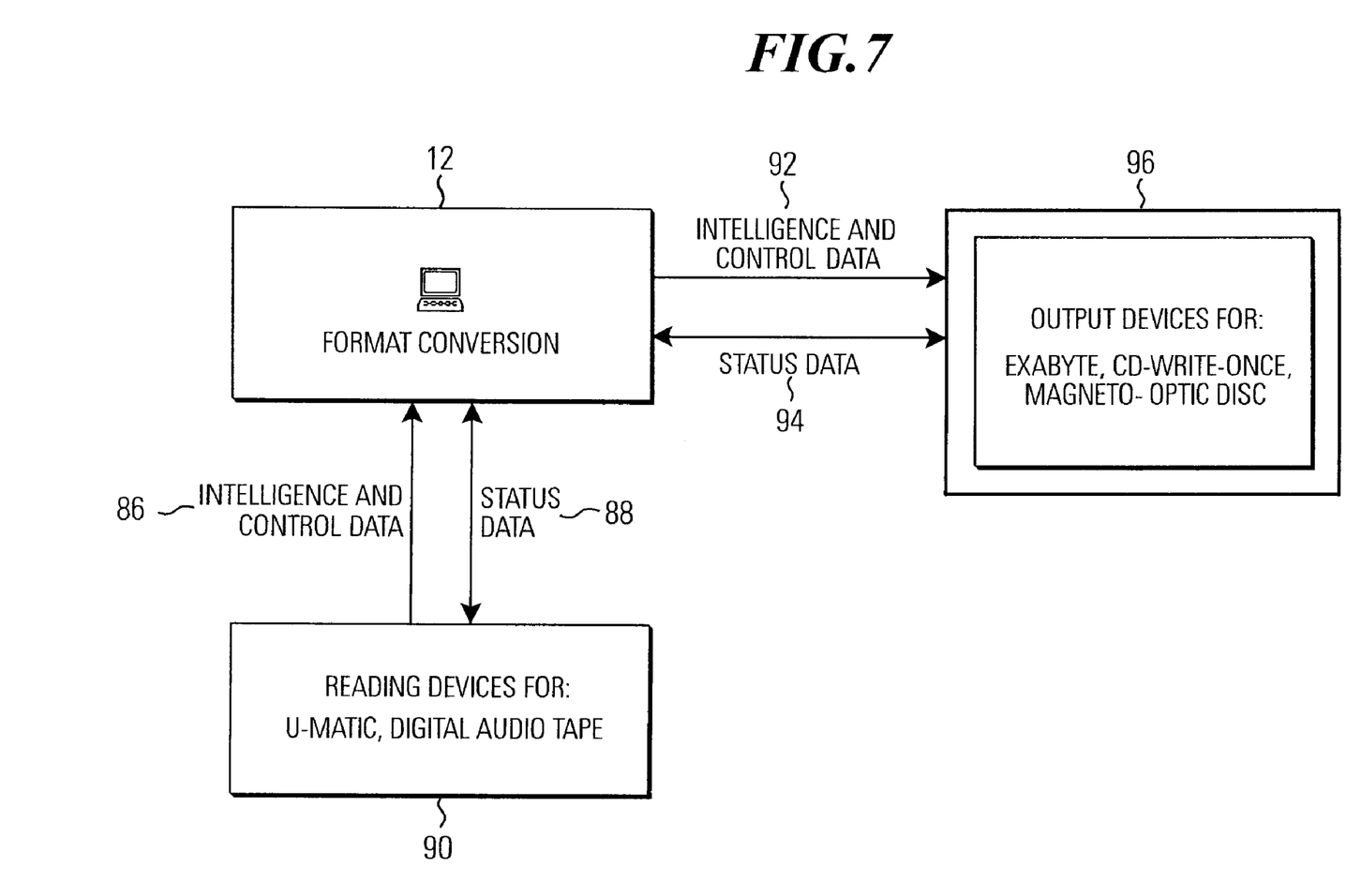
FIG. 7 illustrates the data flow and hardware components of format conversion stations.

FIG. 7

FIG. 7 illustrates the data flows and hardware components of format conversion stations. A format conversion station 12 consists of a PC or a workstation to which the input units 90 and output units 96 are connected. The useful and control information 86 to be converted is read from the music/data carriers inserted in the input units 90, converted into the output format and transferred as a data stream 92 to the output units 96. Both during read-in from the input units 90 and during read-out to the output units 96 status messages as to the process actions are swapped between the format conversion station 12 and the connected input units 90 and output units 96 respectively.

Figure 8:
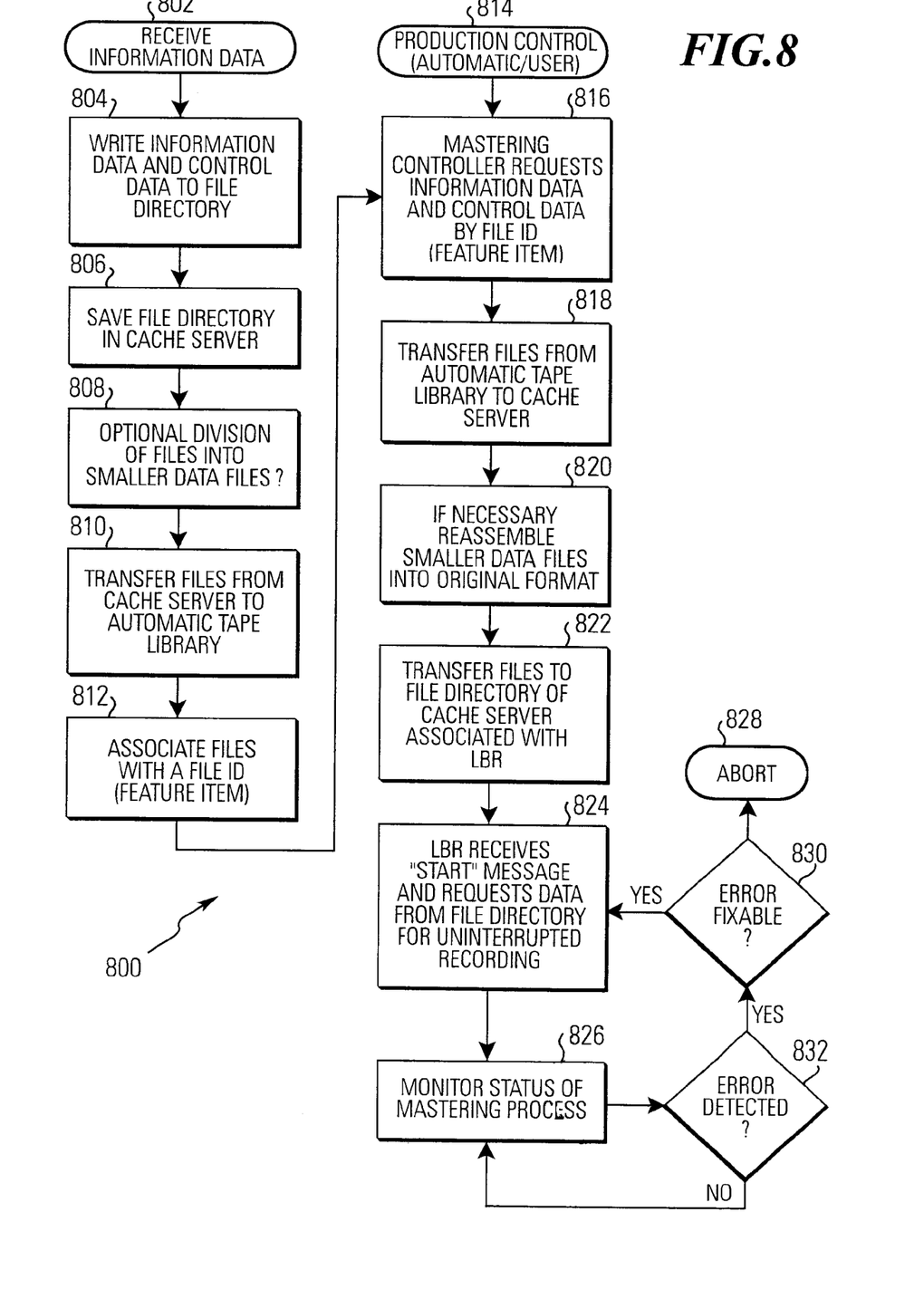
FIG. 8 is a schematic representation of the work flow for producing glass masters

FIG. 8

FIG. 8 is a schematic representation 800 of the flow of information for producing glass masters with the aid of the network-based attachment. The useful and control information generated by the checking and processing stations 38, step 802, is written into a logic network file directory, step 804, saved on a hard disk of the cache server, step 806, where dissection of the stored useful and control information into several smaller data files can be done, step 808. The files thus generated are durably stored in the automatic tape library, steps 810 and 812. For activating mastering, step 814, an ID is transferred from the production control system to the mastering controller 18. The mastering controller 18 requests by this ID via the object management computer the corresponding data files, step 816. The object management computer 14 "sees" on the basis of the entries in its data base the associated file codes and requests the automatic tape library 24 to transfer the corresponding files into a predetermined network file directory the cache server, step 818. Here, where necessary, the original format of the files is reinstated in a further process, step 820. Subsequently, the files thus generated are transferred into a network file directory of the cache server assigned to the respective LBR interface 50, step 822. The mastering controller 18 outputs a start message to the LBR interface 50 at the desired point in time of mastering, step 824. Due to the conventions agreed to, the LBR interface "sees" in which network file directory the files belonging to the mastering process are situated and requests them from the network file directory, step 824. During mastering, status messages are written from the LBR interface into a predetermined network file directory of the cache server. Due to the conventions agreed to, the mastering controller 18 "sees" which network file directory is assigned to the corresponding LBR interface 50. The status messages accumulating in this network file directory are analyzed by the mastering controller 18 and converted into corresponding reactions, steps 828, 830, 832.

What is claimed is:

1. A process for producing a master for optical data carriers using a laser beam recorder, comprising:

receiving digital information data to be recorded;

checking and processing said digital information data and adding control data to generate preliminary mastering data;

storing the preliminary mastering data in an archival data storage device;

associating feature item with the preliminary mastering data and storing the feature item in a database that is separate from the archival data storage device;

requesting the associated preliminary mastering data based on a stored feature item;

transferring the requested preliminary mastering data from the archival data storage device to a cache server; and transmitting the transferred preliminary mastering data as a continuous file without interruption from the cache server to the laser beam recorder for uninterrupted recording of the master, wherein the cache server stores an immediately preceding file in addition to the transferred preliminary mastering data.

2. A process for producing a master for optical data carriers using a laser beam recorder, comprising:

receiving digital information data to be recorded;

checking and processing said digital information data and adding control data to generate preliminary mastering data;

storing the preliminary mastering data in an archival data storage device;

associating feature item with the preliminary mastering data and storing the feature item in a database that is separate from the archival data storage device;

requesting the associated preliminary mastering data based on a stored feature item;

transferring the requested preliminary mastering data from the archival data storage device to a cache server; and transmitting the transferred preliminary mastering data as a continuous file without interruption from the cache server to the laser beam recorder for uninterrupted recording of the master, wherein the cache server, in addition to the transferred preliminary mastering data, stores a file to be recorded immediately following the transferred preliminary mastering data.

3. A process for producing a master for optical data carriers using a laser beam recorder, comprising:

receiving digital information data to be recorded;

checking and processing said digital information data and adding control data to generate preliminary mastering data;

storing the preliminary mastering data in an archival data storage device;

associating feature item with the preliminary mastering data and storing the feature item in a database that is separate from the archival data storage device;

requesting the associated preliminary mastering data based on a stored feature item, which includes requesting and locating a physical storage medium that includes the digital information data and control data, if the associated preliminary mastering data-cannot be located on the archival data storage device; and transferring the digital information data and control data as a continuous file without interruption from the physical storage medium directly to the laser beam recorder for uninterrupted recording of the master.

4. A process for producing a master for optical data carriers using a laser beam recorder, comprising:

receiving digital information data to be recorded;

checking and processing said digital information data and adding control data to generate preliminary mastering data;

storing the preliminary mastering data in an archival data storage device;

associating feature item with the preliminary mastering data and storing the feature item in a database that is separate from the archival data storage device;

requesting the associated preliminary mastering data based on a stored feature item;

transferring the requested preliminary mastering data from the archival data storage device to a cache server; and transmitting the transferred preliminary mastering data as a continuous file without interruption from the cache server to the laser beam recorder for uninterrupted recording of the master, wherein the cache server transfers digital information data and control data to the archival data storage device if the cache server exceeds a predetermined capacity or the information data and control data are no longer needed to mastering.

5. The process of claim 4, wherein the predetermined capacity is dynamically adjusted depending on the requirements of the process that produces the masters.

6. A process for producing a master for optical data carriers using a laser beam recorder, comprising:

receiving digital information data to be recorded;

checking and processing said digital information data and adding control data to generate preliminary mastering data;

storing the preliminary mastering data in an archival data storage device;

associating feature item with the preliminary mastering data and storing the feature item in a database that is separate from the archival data storage device;

requesting the associated preliminary mastering data based on a stored feature item;

transferring the requested preliminary mastering data from the archival data storage device to a cache server; and transmitting the transferred preliminary mastering data as a continuous file without interruption from the cache server to the laser beam recorder for uninterrupted recording of the master, wherein the preliminary mastering data are transferred to the cache server only after at least a portion of the associated feature item is available for checking a consistency of preliminary mastering data.

7. A process for producing a master for optical data carriers using a laser beam recorder, comprising:

receiving digital information data to be recorded;

checking and processing said digital information data and adding control data to generate preliminary mastering data;

storing the preliminary mastering data in an archival data storage device;

associating feature item with the preliminary mastering data and storing the feature item in a database that is separate from the archival data storage device;

requesting the associated preliminary mastering data based on a stored feature item;

transferring the requested preliminary mastering data from the archival data storage device to a cache server;

transmitting the transferred preliminary mastering data as a continuous file without interruption from the cache server to the laser beam recorder for uninterrupted recording of the master; and monitoring recording of the master and adjusting a process parameter for controlling production of the master.

8. The process of claim 7, wherein the process parameter is a recording speed used for recording the master.

9. The process of claim 7, wherein the process parameter is a recording error detected during recording of the master.

10. A process for producing a master for optical data carriers using a laser beam recorder, comprising:

receiving digital information data to be recorded;

checking and processing said digital information data and adding control data to generate preliminary mastering data;

storing the preliminary mastering data in an archival data storage device;

associating feature item with the preliminary mastering data and storing the feature item in a database that is separate from the archival data storage device;

requesting the associated preliminary mastering data based on a stored feature item;

transferring the requested preliminary mastering data from the archival data storage device to a cache server; and transmitting the transferred preliminary mastering data as a continuous file without interruption from the cache server to the laser beam recorder for uninterrupted recording of the master,
wherein the requested preliminary mastering data are transferred from the archival data storage device to the cache server and subsequently transmitted from the cache server to the laser beam recorder via a network.

* * * * *